United States Patent [19]

Morishita et al.

[11] Patent Number: 4,869,333
[45] Date of Patent: Sep. 26, 1989

[54] MOTOR-DRIVEN TYPE POWER STEERING CONTROL DEVICE

[75] Inventors: Mitsuharu Morishita; Shinichi Kohge, both of Hyogo, Japan

[73] Assignee: Mitsubishi Denki Kabushiki Kaisha, Tokyo, Japan

[21] Appl. No.: 147,329

[22] Filed: Jan. 22, 1988

[30] Foreign Application Priority Data

Jan. 23, 1987 [JP] Japan .................................. 62-14351
Jan. 23, 1987 [JP] Japan .................................. 62-14352

[51] Int. Cl.$^4$ .............................................. B62D 5/04
[52] U.S. Cl. ................................... 180/79.1; 318/599
[58] Field of Search ....................... 180/79.1, 141, 142, 180/143, 147, 271, 279; 318/587, 635, 638, 650, 599

[56] References Cited

U.S. PATENT DOCUMENTS

| | | | |
|---|---|---|---|
| 4,290,000 | 9/1981 | Sun | 318/635 |
| 4,532,567 | 7/1985 | Kade | 180/79.1 |
| 4,567,413 | 1/1986 | Yabe | 180/79.1 |
| 4,573,545 | 3/1986 | Kalns | 180/79.1 |
| 4,611,682 | 9/1986 | Yasuda | 180/79.1 |
| 4,624,335 | 11/1986 | Shiraishi | 180/142 |
| 4,745,514 | 5/1988 | Takeshima | 180/142 |

FOREIGN PATENT DOCUMENTS

| | | | |
|---|---|---|---|
| 2579547 | 10/1986 | France | 180/79.1 |
| 48267 | 3/1984 | Japan | 180/79.1 |
| 169366 | 7/1986 | Japan | 180/79.1 |
| 207269 | 9/1986 | Japan | 180/79.1 |
| 12459 | 1/1987 | Japan | 180/79.1 |
| 2145678 | 4/1985 | United Kingdom | 180/79.1 |

*Primary Examiner*—Mitchell J. Hill
*Attorney, Agent, or Firm*—Bernard, Rothwell & Brown

[57] ABSTRACT

A motor-driven type power steering control device includes a control unit. When the control unit detects that power elements are short-circuited or in an open state, the control unit cuts off a current supplied from the power elements to a motor and a voltage applied to an electromagnetic clutch. By modifying a control program for the control unit, it is possible to attain the measures for preventing that burning of a wiring or a battery from dying upon short-circuiting of the power elements and the measures for preventing that only one side of a steering wheel becomes light to steer upon breakage of the power elements.

4 Claims, 6 Drawing Sheets

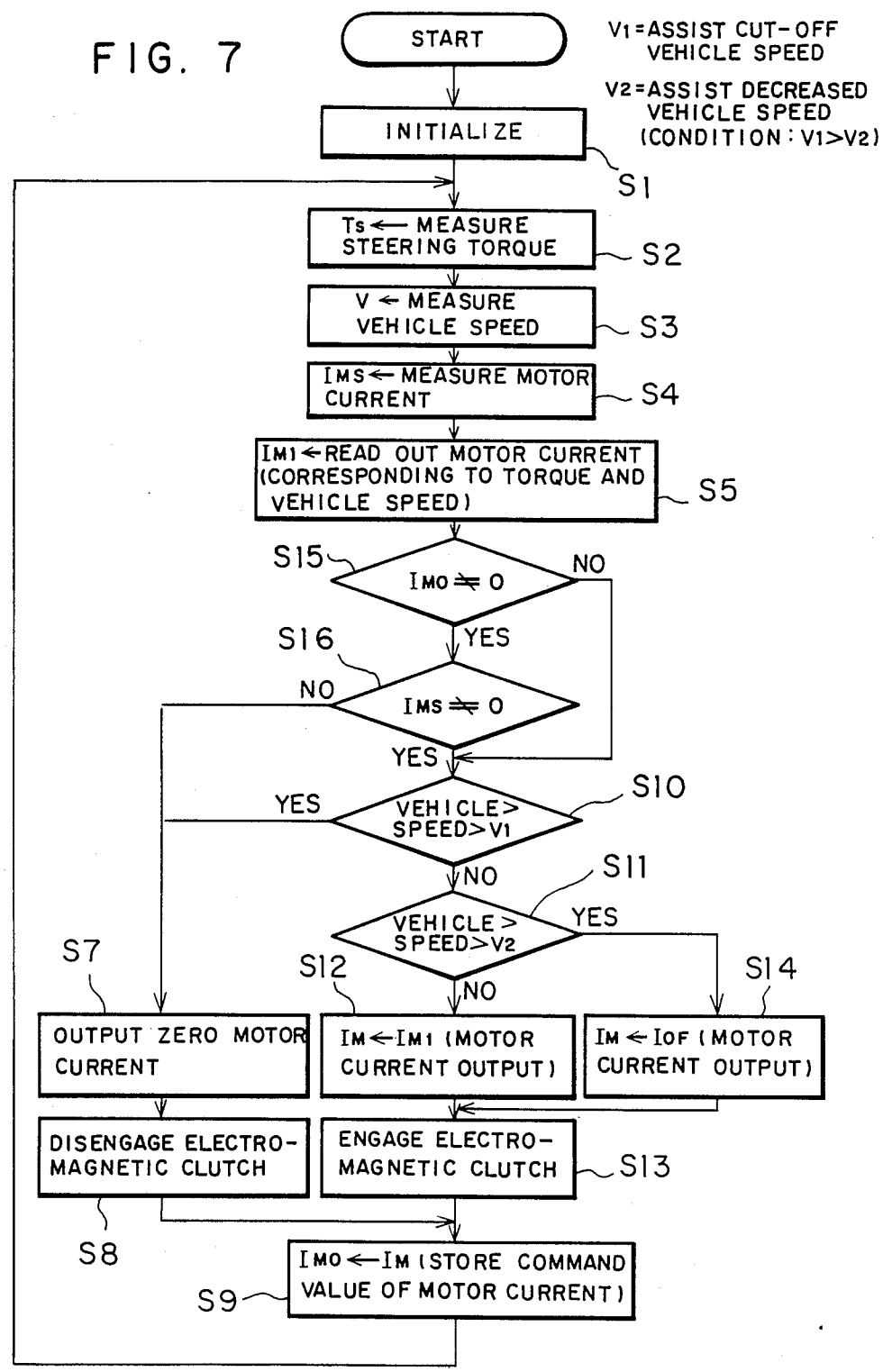

MOTOR-DRIVEN TYPE POWER STEERING CONTROL DEVICE

BACKGROUND OF THE INVENTION

1. Field of the Invention

The present invention relates to a power steering control device, and more particularly a motor-driven type power steering control device for power assisting a steering device of an automobile with the aid of a torque of a motor.

2. Prior Art

Conventionally, this kind of motor-driven type power steering control device is designed to transmit a driving force of a motor through a reduction gear to a transmitting mechanism such as a gear and a belt and power assist a steering shaft or a rack shaft through the transmitting mechanism.

However, the conventional motor-driven type power steering control device has a defect such that when power elements constituting a power element unit for controlling a value and a direction of current to be supplied to the motor are short-circuited, a wiring is burnt or a battery dies.

Furthermore, the conventional motor-driven type power steering control device has another defect such that when the power elements as mentioned above are broken, only one side of a steering wheel becomes light to steer.

SUMMARY OF THE INVENTION

The present invention has been accomplished to solve the above-mentioned problems, and it is an object of the present invention to provide a motor-driven type power steering control device which prevents the wiring from being burnt or the battery from becoming discharged upon short-circuiting of the power elements, and ensures a high safety without a great increase in cost.

It is another object of the present invention to provide a motor-driven type power steering control device which prevents one side of the steering wheel from becoming light to steer upon breakage of the power elements, and ensures a high safety without a great increase in cost.

The motor-driven type power steering control device according to the present invention is provided with a control unit adapted to detect that the power elements for driving the motor are short-circuited or in an open state, and then cut off a current to be supplied to the motor and a voltage to be applied to an electromagnetic clutch.

Other objects and features of the invention will be more fully understood from the following detailed description and appended claims when taken with the accompanying drawings.

BRIEF DESCRIPTION OF THE DRAWINGS

FIG. 7 is a flow chart of a control program to be employed for the control device shown in FIG. 6.

PREFERRED EMBODIMENTS OF THE INVENTION

Figure 1:
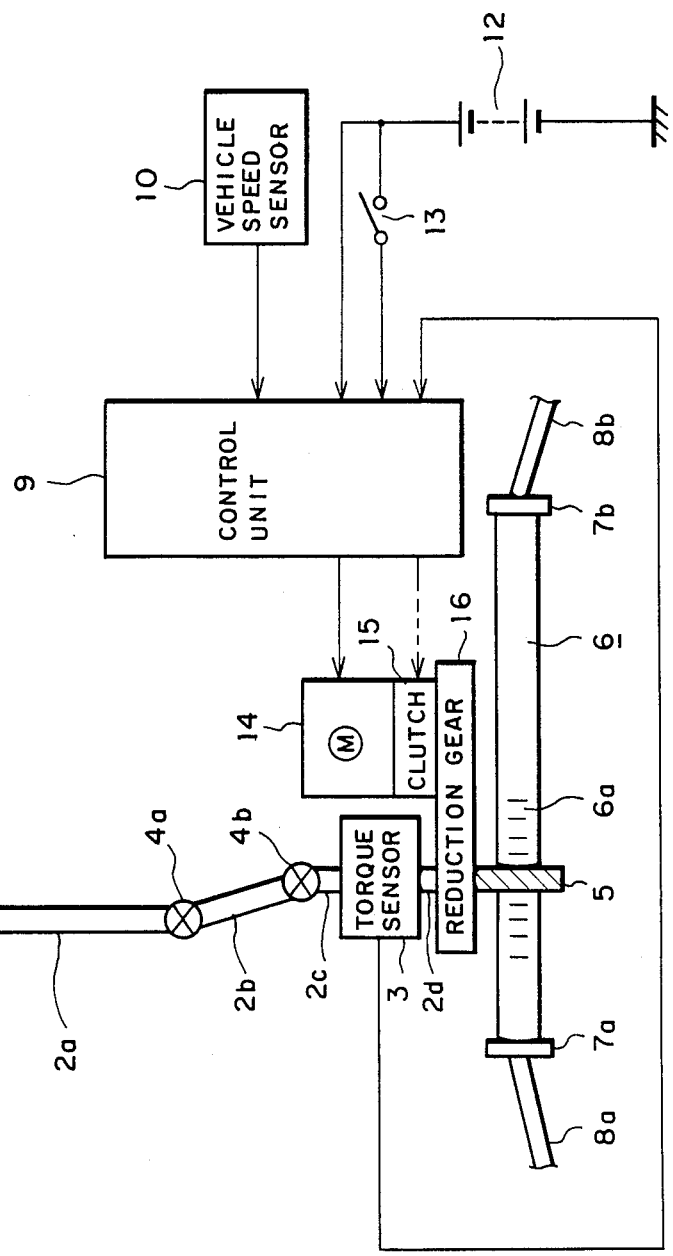
FIG. 1 is a schematic illustration showing a preferred embodiment of the motor-driven type power steering control device according to the present invention.

There will now be described a preferred embodiment of the motor-driven type power steering control device according to the present invention with reference to the drawings. FIG. 1 is a schematic illustration of the preferred embodiment.

Referring to FIG. 1, reference numeral 1 designates a steering wheel adapted to receive a steering torque from a driver, and reference numeral 3 designates a torque sensor for generating an electric signal according to the torque applied to the steering wheel 1.

Between the steering wheel 1 and the torque sensor 3, the steering wheel 1 is connected through a first steering shaft 2a to a first universal joint 4a. The first universal joint 4a is connected through a second steering shaft 2b to a second universal joint 4b. The second universal joint 4b is connected through a third steering shaft 2c to the torque sensor 3.

The torque sensor 3 is connected through a fourth steering shaft 2d to a reduction gear 16. An output from the torque sensor 3 is fed to a steering torque measuring means 9a (which will be hereinafter described with reference to FIG. 2) in a control unit 9.

The reduction gear 16 is interposed between an electromagnetic clutch 15 and a pinion shaft 5. The pinion shaft 5 meshes with a rack teeth portion 6a of a rack shaft 6.

The rack shaft 6 is connected at both ends through ball joints 7a and 7b to tie rods 8a and 8b, respectively.

Reference numeral 12 designates an on-vehicle battery. A negative electrode of the battery 12 is grounded, and a positive electrode thereof is connected through a key switch 13 to the control unit 9. The positive electrode of the battery 12 is also directly connected to the control unit 9.

The control unit 9 is adapted to also receive an output from a vehicle speed sensor 10. The control unit 9 controls a motor 14 and the electromagnetic clutch 15.

The electromagnetic clutch 15 is adapted to mechanically connect and disconnect the motor 14 and the reduction gear 16 according to the output from the control unit 9.

Figure 2:
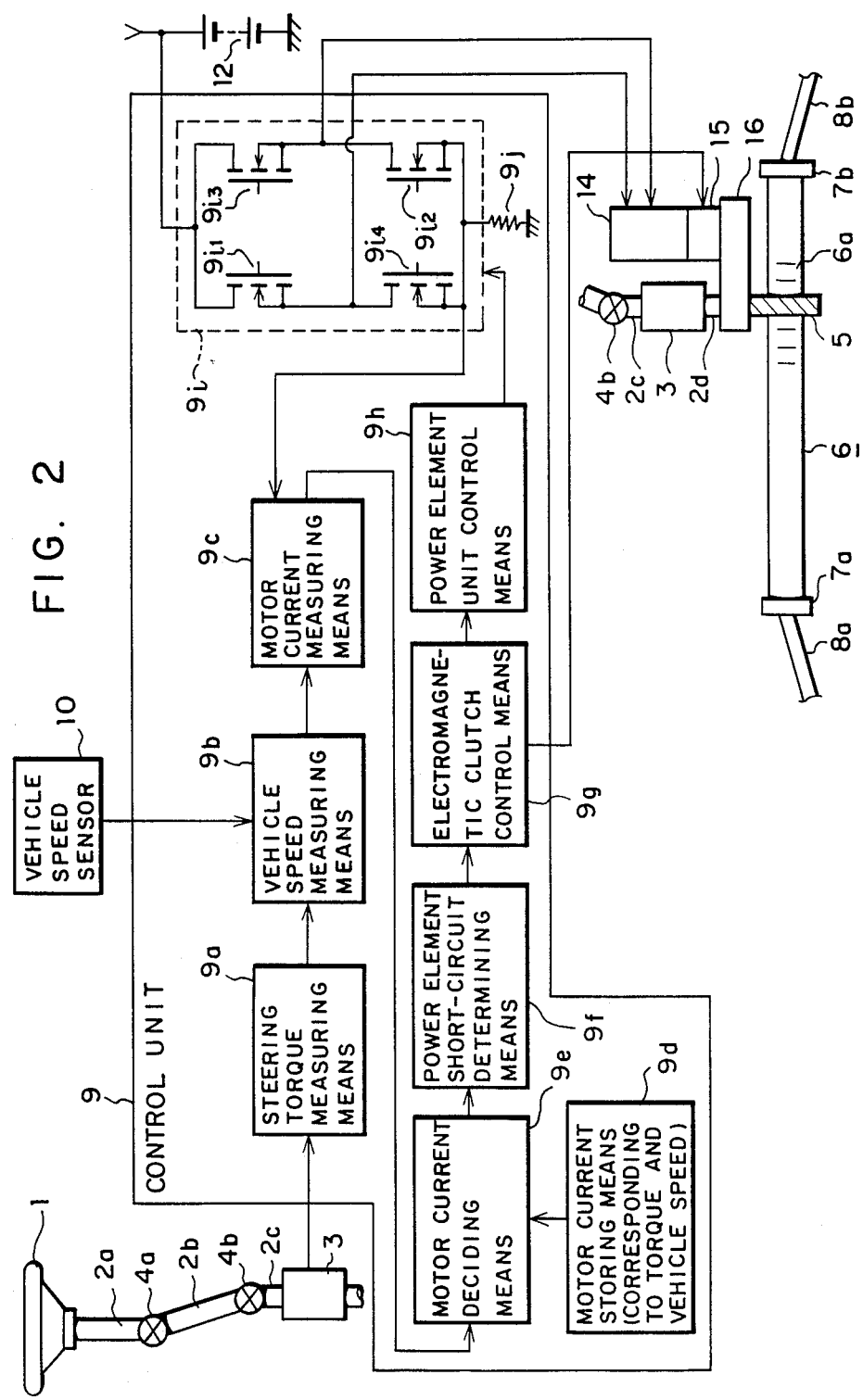
FIG. 2 is a block diagram of the control unit in the control device shown in FIG. 1.

FIG. 2 is a block diagram of the control unit 9 shown in FIG. 1. Referring to FIG. 2, reference numeral 9a designates a steering torque measuring means for measuring a steering torque based on an output from the torque sensor 3, and reference numeral 9b designates a vehicle speed measuring means for measuring a vehicle speed based on an output from the vehicle speed sensor 10.

The steering torque measuring means 9a and the vehicle speed measuring means 9b are connected in cascade with each other, and an output from the vehicle speed measuring means 9b is fed to a motor current measuring means 9c.

The motor current measuring means 9c is adapted to receive a voltage corresponding to a current flowing through a current sensor 9j to be hereinafter described and measured a current to be supplied to the motor 14.

A motor current storing means 9d is adapted to store and hold a current value of the motor 14 corresponding to a steering torque and a vehicle speed.

Normally, the value stored and held by the motor current storing means 9d determines the value read out from a motor current deciding means 9e. If an output from a power element short-circuit determining means 9f subsequently connected to the motor current deciding means 9e is a short-circuit output, the motor current deciding means 9e decides the current to be supplied to a motor instead of the value stored and held by motor current storing means 9d.

When a motor current measured by the motor current measuring means 9c is not less than a command current to be supplied to the motor 14, and the difference between the measured current and the command current is not less than a predetermined value, the power element short-circuit determining means 9f determines that power elements $9i_1$–$9i_4$ constituting a power element unit 9i are short-circuited.

An electromagnetic clutch control means 9g is provided to control the engagement and disengagement of the electromagnetic clutch 15 according to the conditions to be defined by at least a vehicle speed and the condition of the output from the power element short-circuit determining means 9f.

A power element unit control means 9h is provided to switch on and off the power element unit 9i according to the output from the motor current deciding means 9e, so as to control a direction and a value of current to be supplied to the motor 14.

The power element unit 9i controls the direction and the value of current to be supplied to the motor 14 according to the output from the power element unit control means 9h. As mentioned above, the power element unit 9i is constituted of the first to fourth power elements $9i_1$–$9i_4$.

The value of current flowing through the power element unit 9i is measured by the current sensor 9j.

A voltage corresponding to the current flowing through the current sensor 9j is applied to the motor current measuring means 9c.

Figure 3:
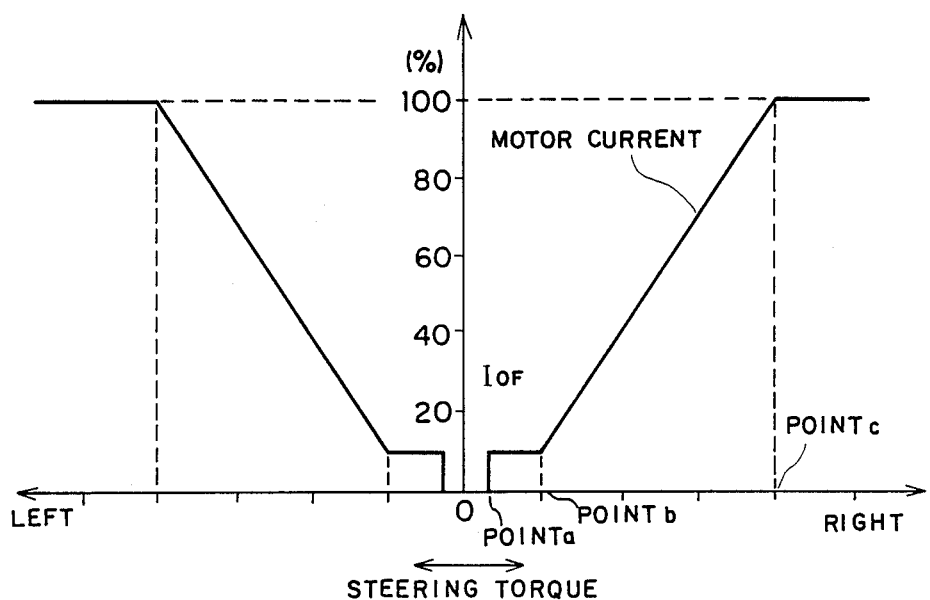
FIG. 3 is a control characteristic diagram of a motor current with respect to a steering torque.
Figure 4:
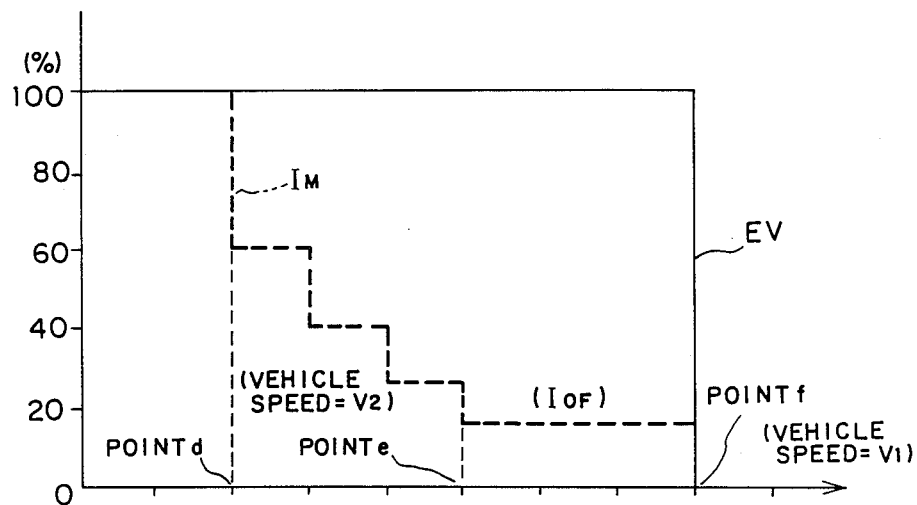
FIG. 4 is a control characteristic diagram of a motor current and a voltage to be applied to an electromagnetic clutch with respect to a vehicle speed.
Figure 5:
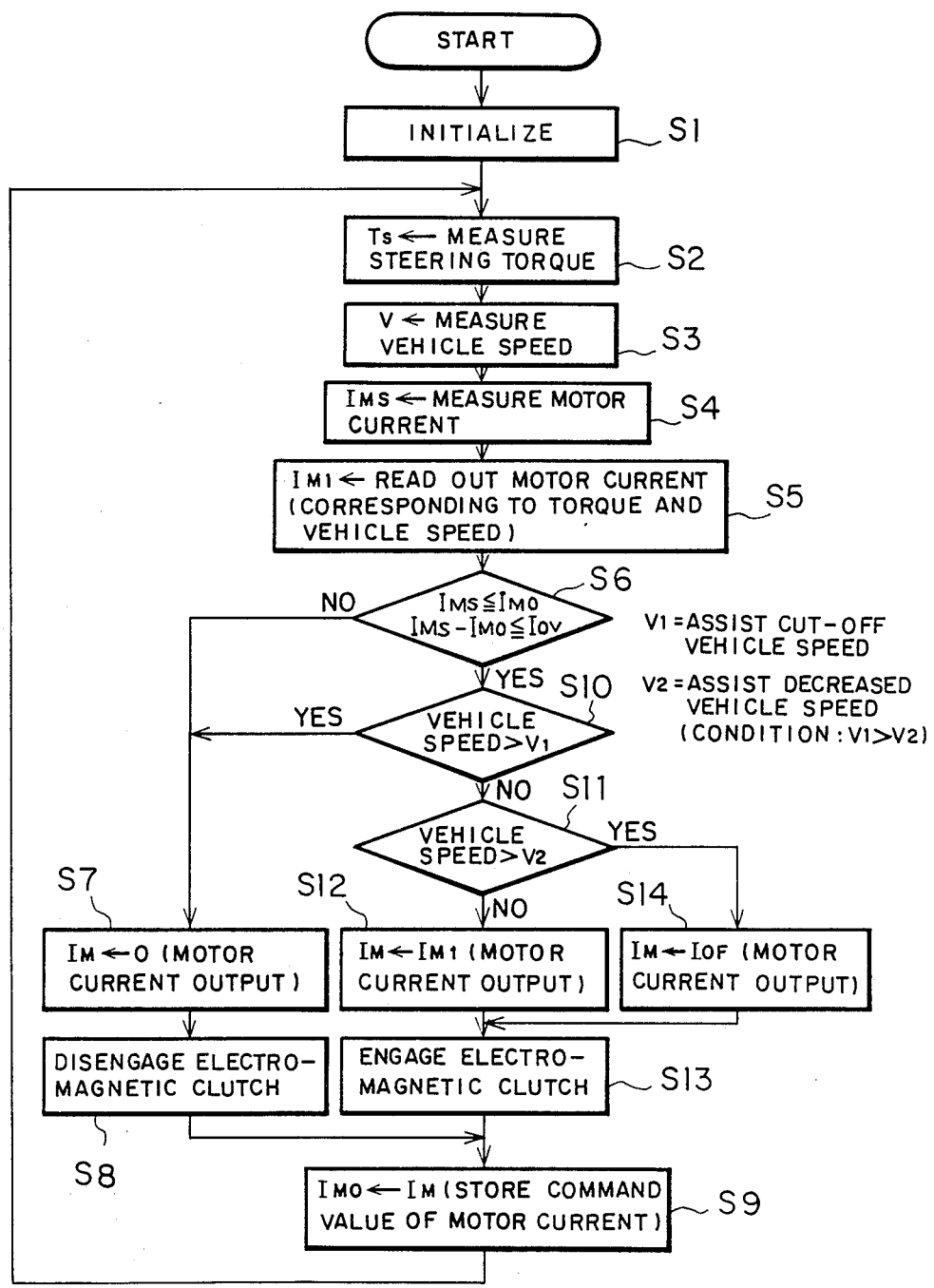
FIG. 5 is a flow chart of a control program to be employed for the preferred embodiment of the control device according to the present invention.

The operation of the above-mentioned preferred embodiment will now be described with reference to FIGS. 3 to 5. FIG. 3 is a control characteristic diagram of a motor current with respect to a steering torque; FIG. 4 is a control characteristic diagram of a motor current and a voltage to be applied to the electromagnetic clutch with respect to a vehicle speed; and FIG. 5 is a flow chart showing a control program of the control unit 9.

First, at starting of an engine, the control unit 9 is initialized in step S1. The key switch 13 is turned on to energize the electromagnetic clutch 15 and thereby mechanically connect the motor 14 to the reduction gear 16.

When a steering torque is applied to the steering wheel 1 by the driver under the condition as mentioned above, the current to be applied to the motor 14 is controlled by the control unit 9 as shown in FIG. 3. At this time, the steering torque measuring means 9a receives an output from the torque sensor 3 to measure a steering torque Ts in step S2.

Referring to FIG. 3, when the steering torque is increased in the right direction, the motor 14 is energized at a point a to supply a current $I_{OF}$ to the motor 14, so as to reduce the influence of inertia of the motor 14 and a mechanical system. At this time, a motor current $I_{MS}$ is measured by the motor current measuring means 9c according to the current flowing through the current sensor 9j (step S4).

When the steering torque is increased, the motor current is linearly increased from a point b to a point c, at which point c the motor current of 100% is being supplied.

Conversely, when the steering torque is decreased, the motor current is reduced from the point c to the point b, at which point b the motor current $I_{OF}$ is being supplied.

When the torque is further decreased, the motor 14 becomes off. The above-mentioned control operation is substantially similarly conducted in the case that the steering torque is increased in the left direction.

The relation between the transmitting torque and the motor current is a proportional relation. Accordingly, when the torque is increased as shown in FIG. 3, and the motor 14 becomes on at the point a, and the motor current $I_{OF}$ flows in the motor 14.

When the torque is further increased, the current to be supplied to the motor 14 is gradually increased from the point b, thereby gradually increasing an output torque to the reduction gear 16 and transmitting an assist torque through the electromagnetic clutch 15, the reduction gear 16 and the pinion shaft 5 to the rack teeth portion 6a according to the rotating force applied to the steering wheel 1 by the driver. As a result, the steering torque to be applied to the steering wheel 1 may be reduced. The above discussion is applicable to the stop condition of a vehicle.

When the vehicle starts to run, a vehicle speed is measured by the vehicle speed measuring means 9b based on an output from the vehicle speed sensor 10 in step S3. Then, a motor current is measured in step S4. As shown in FIG. 4, the current $I_{MI}$ preliminarily stored and held in the motor current storing means 9d according to a steering torque and a vehicle speed is read from the motor current deciding means 9e in step S5. Thus, the motor current is controlled with the current $I_{MI}$.

Referring to FIG. 4, the value of the current $I_{MI}$ corresponds to only the steering torque up to the vehicle speed at a point d. In the vehicle speed range from the point d to a point e, the value of the current $I_{MI}$ is reduced to a value obtained by multiplying the current value corresponding to the steering torque by a damping factor according to the vehicle speed. In the vehicle speed range from the point e to a point f (the vehicle speed=assist decreased vehicle speed $V_2$), the current value is maintained at $I_{OF}$, so as to reduce the influence of inertia of the mechanical system.

When the vehicle speed is further increased to a value at the point f (the vehicle speed=assist cut-off vehicle speed $V_1$ ($V_1 > V_2$)), the motor current $I_{MI}$ and a voltage $E_V$ to be applied to the electromagnetic clutch become zero. As a result, the motor 14 is disengaged from the reduction gear 16. Thus, the steering wheel 1 being handled by the driver is steered without an assist power.

However, the prior art device has some problems such that a wiring is burnt or the battery dies when the power elements $9i_1$–$9i_4$ of the power element unit 9i are short-circuited.

According to the present invention, when it is determined in step S6 that the motor current $I_{MS}$ detected by the current sensor 9j is greater than the command current $I_{MO}$ to be supplied to the motor 14, and that the difference between the motor current $I_{MS}$ and the command current $I_{MO}$ is greater than a predetermined value $I_{OV}$, the power element short-circuit determining means 9$f$ determines that the power element has been short-circuited. Then, the current to be supplied to the motor 14 and the voltage to be supplied to the electromagnetic clutch 15 are controlled to be zero in steps S7 and S8, respectively, so that the power assisted condition is released. At the same time, the current $I_M$ to be supplied to the motor 14 is set and stored as the command current $I_{MO}$.

If it is determined in step S6 that the motor current is not less than the command current and that the difference between the motor current and the command current is not greater than the predetermined value, the program proceeds to step S10. In step S10, it is determined that the vehicle speed V is greater than the assist cut-off vehicle speed $V_1$, namely, $V > V_1$, the processings of step S7 to S9 are executed. If $V > V_1$ is not held, the program proceeds to step S11.

In step S11, it is determined that the vehicle speed V is not greater than the assist decreased vehicle speed $V_2$ ($V_1 > V_2$), the program proceeds to step S12, where the motor current $I_M$ is set to $I_{MI}$, and the electromagnetic clutch is engaged in step S13 to execute the processing of step S9.

On the other hand, it is determined in step S11 that the vehicle speed V is greater than the assist decreased vehicle speed $V_2$, namely, $V > V_2$, the program proceeds to step S14, where the motor current $I_M$ is set to $I_{OF}$. Then, the processings of steps S13 and S9 are executed.

Figure 6:
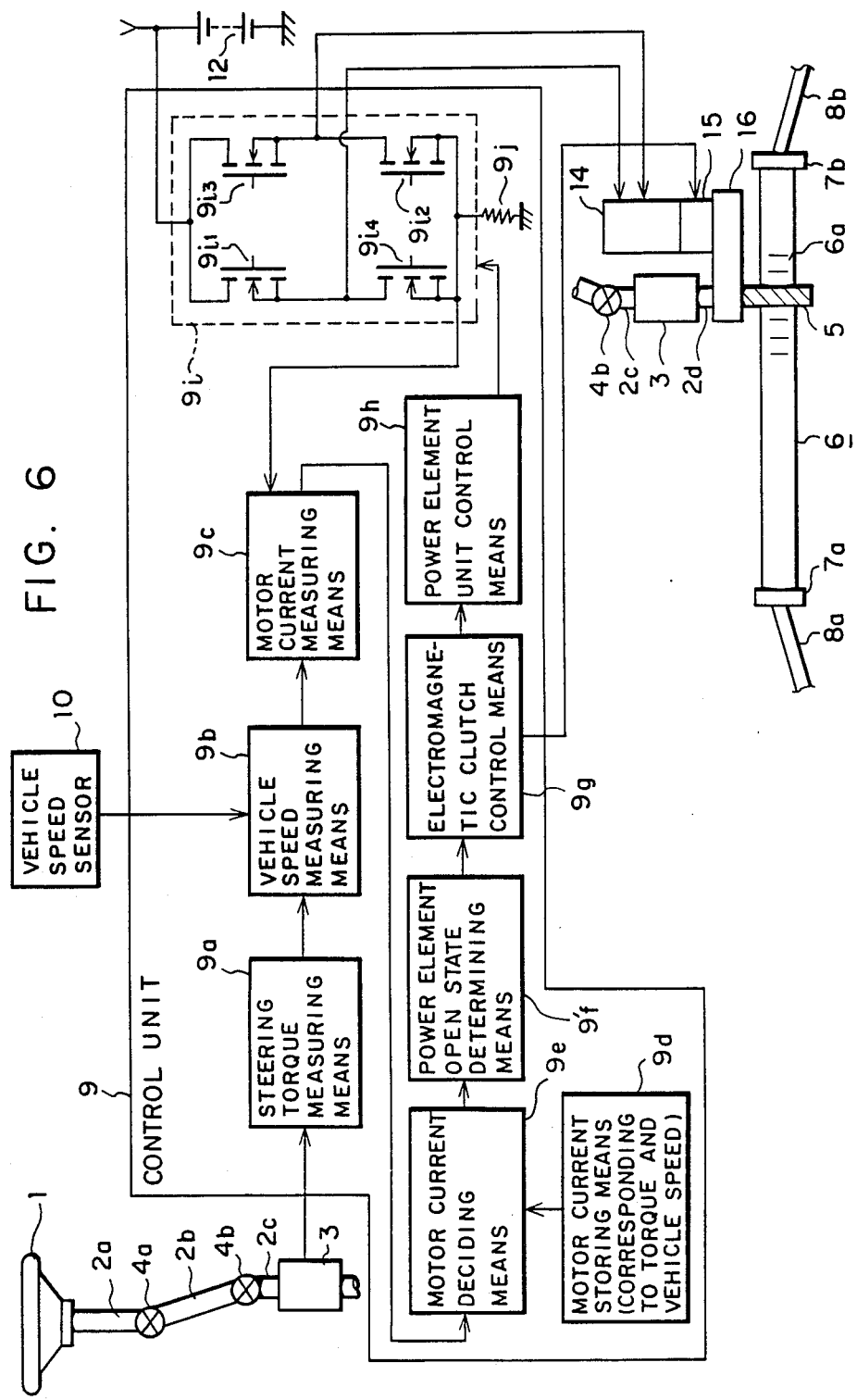
FIG. 6 is a block diagram of the control unit of the control device of another embodiment.

FIG. 6 is a block diagram of the control unit of another embodiment according to the present invention, in which the same parts as in FIG. 2 are designated by the same reference numerals, and the explanation thereof will be omitted.

Referring to FIG. 6, reference numeral 9'$f$ designates a power element open state determining means. Normally, the value stored and held by the motor current storing means 9$d$ is decided to a value read out from the motor current deciding means 9$e$. If an output from the power element open state determining means 9'$f$ subsequently connected to the motor current deciding means 9$e$ is an open state output, the motor current deciding means 9$e$ decides the current to be supplied to the motor 14 to be zero.

When a motor current measured by the motor current measuring means 9$c$ is zero, the power element open state determining means 9'$f$ determines that the power elements 9$i_1$–9$i_4$ constituting the power element unit 9$i$ for controlling the value and the direction of the current to be supplied to the motor 14 are open.

The electromagnetic clutch control means 9$g$ is provided to control the engagement and disengagement the electromagnetic clutch 15 according to the conditions to be defined by at least a vehicle speed and the condition of the output from the power element open state determining means 9'$f$.

The power element unit control means 9$h$ is provided to switch on and off the power element unit 9$i$ according to the output from the motor current deciding means 9$e$, so as to control the direction and the value of current to be supplied to the motor 14. As mentioned above, the power element unit 9$i$ is constituted of the first to fourth power elements 9$i_1$–9$i_4$ for controlling the direction and the value of the current to be supplied to the motor 14 according to the output from the power element unit control means 9$h$.

The value of current flowing through the power element unit 9$i$ is measured by the current sensor 9$j$.

A voltage corresponding to the current flowing through the current sensor 9$j$ is applied to the motor current measuring means 9$c$.

The operation of the device of the second embodiment will now be described with reference to FIG. 7 showing a flow chart of a control program of the control unit 9.

The prior art device has a problem such that only one side of the steering wheel 1 becomes light to steer, causing a danger when the power element 9$i_1$–9$i_4$ of the power element unit 9$i$ are broken.

According to the second embodiment of the present invention, when it is determined in step S16 that the motor current detected by the current sensor 9$i$ is zero, the power element open state determining means 9'$f$ determines that the power element is in an open state.

When it is determined in step S15 that the command current $I_{MO}$ is zero, the program proceeds to step S10, where if the vehicle speed V is greater than the assist cut-off vehicle speed $V_1$, namely, $V > V_1$, the program proceeds to step S7. In step S7, the power element unit control means 9$h$ controls to make the motor current zero, and then in step S8, the electromagnetic clutch control means 9$g$ controls to cut off the voltage applied to the electromagnetic clutch 15, so that the power assisted condition is released. Then, in step S9, the motor current $I_M$ to be supplied to the motor 14 is set and stored as the command current $I_{MO}$.

If it is determined in step S15 that the command current is not zero, the program proceeds to step S16. Then, in step S16, if it is determined that the motor current is not zero, the open state of the power element is determined to execute the processings of steps S7 to S9.

On the other hand, if it is determined in step S10 that the vehicle speed V is not greater than the assist cut-off vehicle speed $V_1$, the program proceeds to step S11. Then, if it is determined in step S11 that the vehicle speed V is greater than the assist decreased vehicle speed $V_2$, namely, $V > V_2$, the motor current is changed from $I_{OF}$ to $I_M$ in step S14. Then, in step S13, the electromagnetic clutch 15 is controlled to be engaged by the electromagnetic clutch control means 9$g$. The processing of step S9 is then executed.

If it is determined in step S11 that $V > V_2$ is not held, the program proceeds to step S12, where the motor current is changed from $I_M$ to $I_{MI}$. The proceedings of step S13 and S9 are then executed.

As described above, when the short-circuit of the power element is detected, the motor current and the voltage applied to the electromagnetic clutch are cut off. Accordingly, the measures for preventing the burning of the wiring or the battery from dying upon short-circuiting of the power element and the measures for preventing that only one side of the steering wheel upon brekage of the power element becomes light to steer can be attained by modifying a control program for the control unit, thereby improving the safety without a great increase in cost.

What is claimed is:

1. A motor-driven type power steering control device comprising a torque sensor for detecting a steering torque of a steering wheel of an automobile, a motor adapted to be supplied with current from a battery mounted in said automobile, an electromagnetic clutch for mechanically connecting and disconnecting said motor and a reduction gear, a vehicle speed sensor for detecting a vehicle speed, and a control unit for controlling said electromagnetic clutch and said motor upon receipt of signals from said torque sensor and said vehicle speed sensor, said control unit including a power element unit constituted of power elements for controlling a value and a direction of current supplied to said motor, wherein when a difference between a command current to be supplied to said motor and an actual motor current is greater than a predetermined value, said control unit detects that said power elements are short-circuited and cuts off said motor current and a voltage applied to disconnect said electromagnetic clutch.

2. The motor-driven type power steering control device as defined in claim 1, further comprising a current sensor connected in series with said power element unit for detecting the current supplied to said motor, a motor current measuring means for measuring the current supplied to said motor upon receipt of an output from said current sensor, a power element short-circuit determining means for determining that said power elements are short-circuited when the motor current measured by said motor current measuring means is greater than said command current and the difference between said motor current and said command current is greater than a predetermined value, and an electromagnetic clutch control means for controlling engagement and disengagement of said electromagnetic clutch according to an output condition of said power element short-circuit determining means.

3. A motor-driven type power steering control device comprising a torque sensor for detecting a steering torque of a steering wheel of an automobile, a motor adapted to be supplied with current from a battery mounted in said automobile, an electromagnetic clutch for mechanically connecting and disconnecting said motor and a reduction gear, a vehicle speed sensor for detecting a vehicle speed, and a control unit for controlling said electromagnetic clutch and said motor upon receipt of signals from said torque sensor and said vehicle speed sensor, said control unit including a power element unit constituted of power elements for controlling a value and a direction of current supplied to said motor, wherein when it is detected that said power elements are open, said control unit cuts off the current supplied to said motor and a voltage applied to disconnect said electromagnetic clutch.

4. The motor-driven type power steering control device as defined in claim 3, further comprising a current sensor connected in series with said power element unit for detecting the current supplied to said motor, a motor current measuring means for measuring the current supplied to said motor upon receipt of an output from said current sensor, a power element open state determining means for determining that said power elements are in an open state when the motor current measured by said motor current measuring means is zero, and an electromagnetic clutch control means for controlling engagement and disengagement of said electromagnetic clutch according to an output condition of said power element open state determining means.

* * * * *